US012634666B2

(12) United States Patent
Zaki

(10) Patent No.: US 12,634,666 B2
(45) Date of Patent: May 19, 2026

(54) RICH COMMUNICATION SERVICES ENCRYPTED MESSAGING FALLBACK ON NON-TERRESTRIAL NETWORKS

(71) Applicant: T-MOBILE INNOVATIONS LLC, Overland Park, KS (US)

(72) Inventor: Ayman Zaki, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 315 days.

(21) Appl. No.: 18/221,723

(22) Filed: Jul. 13, 2023

(65) Prior Publication Data

US 2025/0024230 A1 Jan. 16, 2025

(51) Int. Cl.
　*H04W 4/14* (2009.01)
　*H04L 65/1016* (2022.01)
　*H04W 84/06* (2009.01)
(52) U.S. Cl.
　CPC ........... *H04W 4/14* (2013.01); *H04L 65/1016* (2013.01); *H04W 84/06* (2013.01)
(58) Field of Classification Search
　CPC .... H04W 4/14; H04W 84/06; H04L 65/1016; H04L 65/1104

USPC ......................................................... 455/466
See application file for complete search history.

(56) References Cited

U.S. PATENT DOCUMENTS

| | | | | |
|---|---|---|---|---|
| 2015/0012747 A1* | 1/2015 | Choi | ................... | H04L 63/0435 |
| | | | | 713/168 |
| 2021/0014182 A1* | 1/2021 | Stafford | .................. | H04W 8/26 |
| 2021/0392136 A1* | 12/2021 | Modi | .................... | H04W 12/06 |

* cited by examiner

*Primary Examiner* — Huy C Ho
(74) *Attorney, Agent, or Firm* — Shook, Hardy & Bacon

(57) ABSTRACT

Methods and systems are provided herein for facilitating Rich Communication Services (RCS) error messaging in a non-RCS capable network. It is determined that a first device and a second device are communicating using encrypted RCS messaging in a terrestrial network. It is then determined that the second device has transitioned from the terrestrial network to a non-terrestrial network. A determination is made that the first device has sent an encrypted RCS message intended for the second device. Based on the second device transitioning to the non-terrestrial network that does not support the encrypted RCS messaging, an error message is communicated to the first device indicating that the encrypted RCS message cannot be received by the second device.

20 Claims, 4 Drawing Sheets

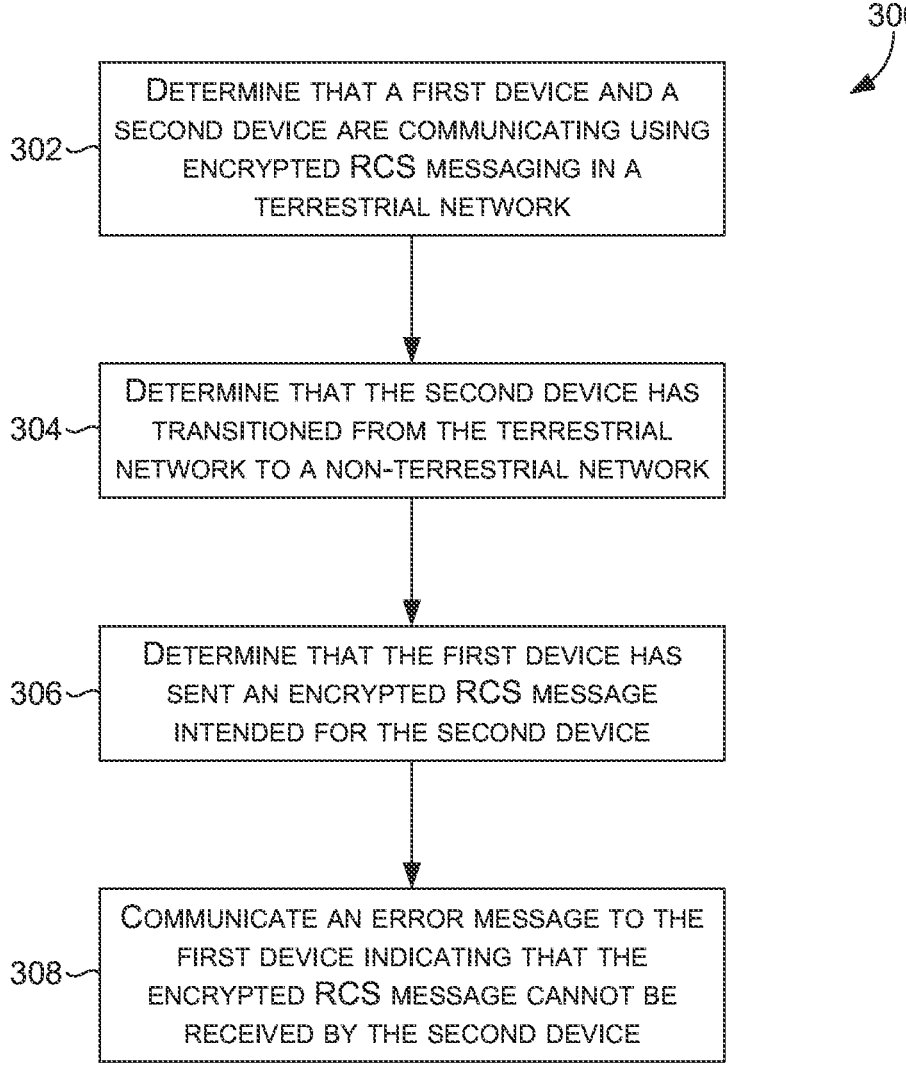

300

302 — DETERMINE THAT A FIRST DEVICE AND A SECOND DEVICE ARE COMMUNICATING USING ENCRYPTED RCS MESSAGING IN A TERRESTRIAL NETWORK

304 — DETERMINE THAT THE SECOND DEVICE HAS TRANSITIONED FROM THE TERRESTRIAL NETWORK TO A NON-TERRESTRIAL NETWORK

306 — DETERMINE THAT THE FIRST DEVICE HAS SENT AN ENCRYPTED RCS MESSAGE INTENDED FOR THE SECOND DEVICE

308 — COMMUNICATE AN ERROR MESSAGE TO THE FIRST DEVICE INDICATING THAT THE ENCRYPTED RCS MESSAGE CANNOT BE RECEIVED BY THE SECOND DEVICE

FIG. 3

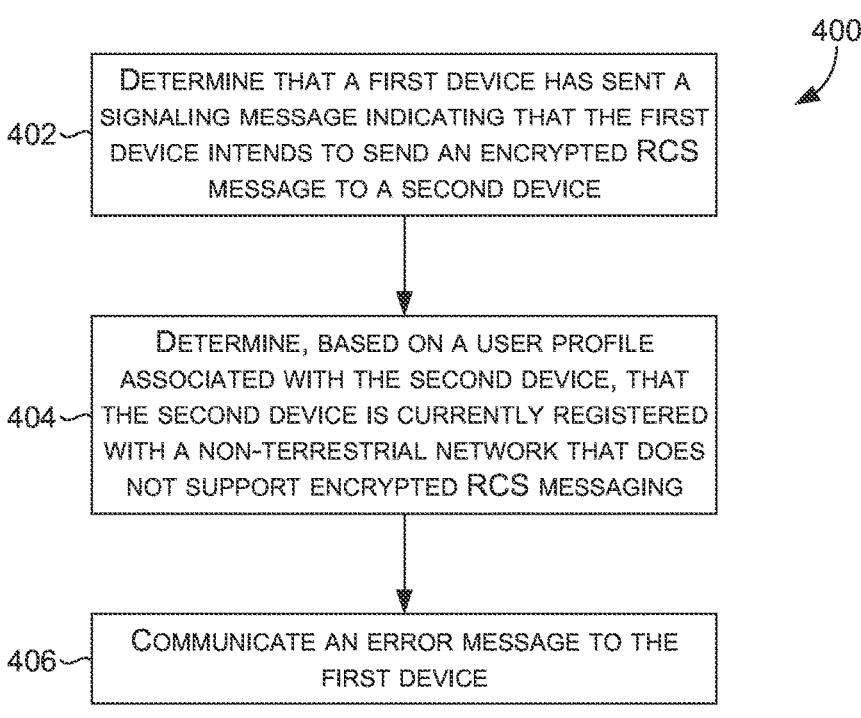

402 — DETERMINE THAT A FIRST DEVICE HAS SENT A SIGNALING MESSAGE INDICATING THAT THE FIRST DEVICE INTENDS TO SEND AN ENCRYPTED RCS MESSAGE TO A SECOND DEVICE

404 — DETERMINE, BASED ON A USER PROFILE ASSOCIATED WITH THE SECOND DEVICE, THAT THE SECOND DEVICE IS CURRENTLY REGISTERED WITH A NON-TERRESTRIAL NETWORK THAT DOES NOT SUPPORT ENCRYPTED RCS MESSAGING

406 — COMMUNICATE AN ERROR MESSAGE TO THE FIRST DEVICE

FIG. 4

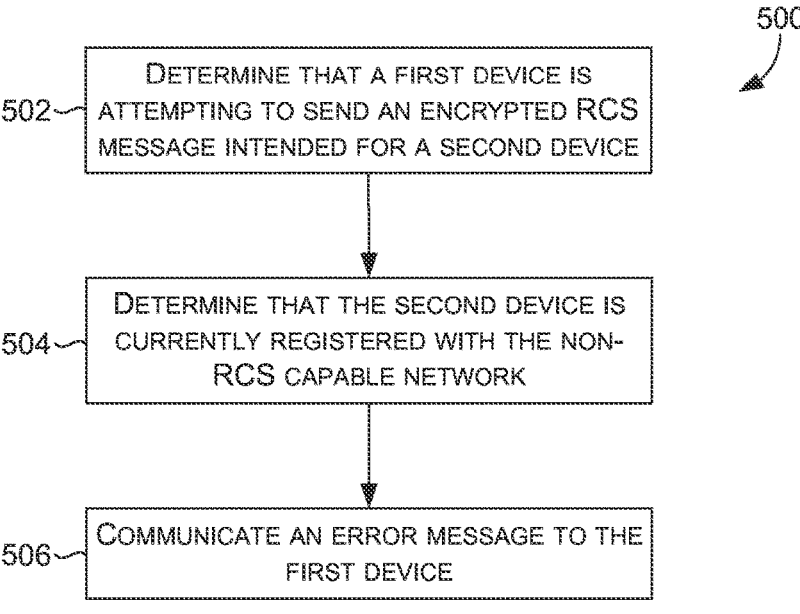

502 — DETERMINE THAT A FIRST DEVICE IS ATTEMPTING TO SEND AN ENCRYPTED RCS MESSAGE INTENDED FOR A SECOND DEVICE

504 — DETERMINE THAT THE SECOND DEVICE IS CURRENTLY REGISTERED WITH THE NON-RCS CAPABLE NETWORK

506 — COMMUNICATE AN ERROR MESSAGE TO THE FIRST DEVICE

FIG. 5

RICH COMMUNICATION SERVICES ENCRYPTED MESSAGING FALLBACK ON NON-TERRESTRIAL NETWORKS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

The present invention provides a system, method, and computer program product facilitating Rich Communication Service (RCS) encrypted messaging errors when a receiving device is incapable of receiving RCS encrypted message, such as when the receiving device transitions from a terrestrial network to a non-terrestrial network (e.g., satellite radio access network). At this time, non-terrestrial networks do not support RCS messaging because of increased bandwidth and other network resources. When an encrypted RCS message is intended for a receiving device registered with a non-terrestrial network, aspects herein provide for sending an error message at one of several different points in time during the signaling/messaging process involved in communicating an encrypted RCS message to a receiving device.

BRIEF DESCRIPTION OF THE DRAWINGS

The present technology is described in detail herein with reference to the drawing figures, which are intended to be exemplary and non-limiting in nature, wherein:

FIG. 3 depicts a block diagram of an exemplary method of facilitating RCS-encrypted messaging errors in a non-terrestrial network, in accordance with an embodiment of the present technology;

FIG. 4 depicts a block diagram of another exemplary method of facilitating RCS-encrypted messaging errors in a non-terrestrial network, in accordance with an embodiment of the present technology; and FIG. 5 depicts a block diagram of another exemplary method of facilitating RCS-encrypted messaging errors in a non-terrestrial network, in accordance with an embodiment of the present technology.

DETAILED DESCRIPTION

Figure 1:
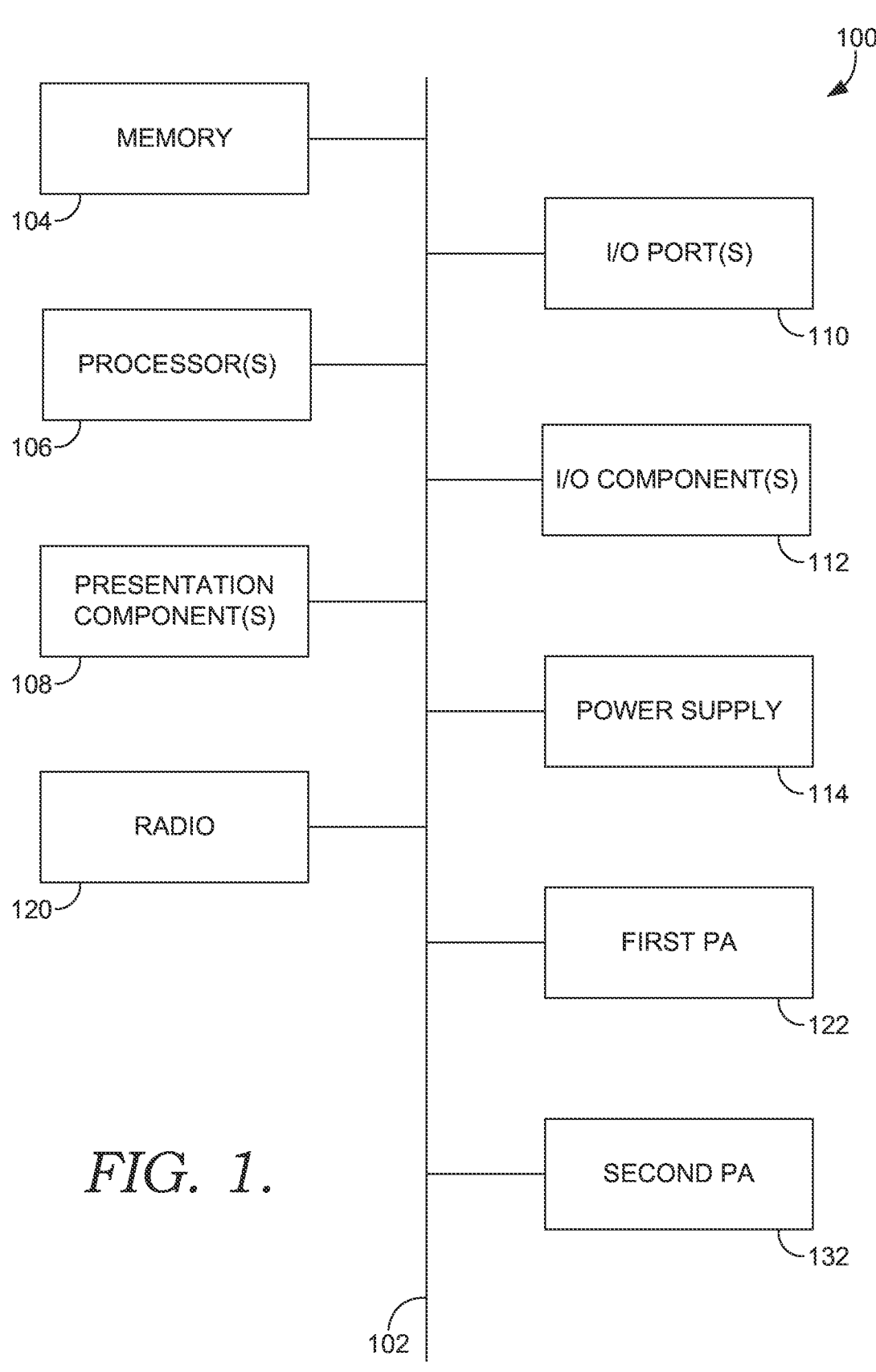
FIG. 1 depicts an exemplary computing environment suitable for use in implementation of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Further, various technical terms are used throughout this description. An illustrative resource that describes these terms may be found in Newton's Telecom Dictionary, 32nd Edition (2022).

A "user device," as used herein, is a device that has the capability of using a wireless communications network, and may also be referred to as a "mobile device," "wireless communication device," or "user equipment (UE)." A user device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, and/or LTE Advanced, among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

By way of background, the provision of telecommunication services is moving beyond the surface of the earth at increasing speed. Network operators, once exclusively operating terrestrial base stations, will begin to utilize satellite communication systems to provide coverage to areas unserved by terrestrial base stations. Because of space launching restrictions on size/weight, the expense of manufacturing a satellite, regulatory pressure, or any other reason, it is likely that the number of satellites used for integration into a cellular telecommunication network will be limited. Therefore, even when a UE is beyond the range of a terrestrial radio access network (RAN), it is unlikely to enjoy persistent satellite coverage. Attempting to make calls, send messages, or otherwise access a data or communications network when no service exists is frustrating to subscribers and can cause safety of life issues in an emergency situation. Conventionally, and prior to the integration of satellite RANs with terrestrial RANs, a subscriber's only options were to seek higher ground or a clearer line of sight to a base station, or to move towards a known/suspected coverage area.

Even more, communication networks are rapidly evolving to become "hybrid" with both terrestrial and non-terrestrial networks available to end-users for their connectivity requirements. In many cases, non-terrestrial (satellite) networks extend and augment terrestrial networks, and are resource-constrained on the access network due to the kind and amount of spectrum deployed for such networks. For example, non-terrestrial network operators may lease limited amounts of spectrum from terrestrial network operators for use on such non-terrestrial networks. The limited number of users that can be supported over such a scarce amount of spectrum requires that only a subset of communication services be available to end-users over this link. As an example, only messaging and low data-rate services would be available, while voice support would not be desired or made available.

SMS is a text messaging service used by many telephone, internet, and mobile device systems. SMS uses standardized communication protocols allowing mobile devices to exchange short text messages. Messages are sent to a short message service center (SMSC), which provides a "store and forward mechanism." The SMSC attempts to send messages to the SMSC's recipients. If a recipient is not reachable, the SMSC queues the message for later retry. Message delivery is "best effort," so there are no guarantees that a message will actually be delivered to the recipient, but delay or complete loss of a message is uncommon, typically affecting less than five percent of messages. SMS is a stateless communication protocol in which every SMS message is considered to be entirely independent of other messages. In the context of the embodiments discussed herein, each voice clip that is transmitted or transcribed to a text message is independent of other messages.

In some aspects discussed herein, RCS may be used in place of the SMS messaging application. RCS is a communication protocol between mobile phone carriers and between phone and carrier, aimed at replacing SMS messages with a text message system that is richer, provides phonebook polling for service discovery, and can transmit in-call multimedia. RCS allows the voice clip of the disclosure to include video when the message is sent in place of a voicemail message. In some instances, RCS messages may be end-to-end encrypted for conversations between users.

For instance, some mobile phone manufacturers have recently enabled end-to-end encryption for RCS messaging for their users.

While the use of end-to-end encryption for RCS messaging has numerous advantages, with the imminent use of non-terrestrial networks, RCS messaging may not be available within these networks, at least for a period of time. Therefore, problems will arise when a user device moves from an area that is covered by a terrestrial network to an area that is covered by only a non-terrestrial network. There may be messages being sent that are intended for that user device, but cannot be received if they are encrypted RCS messages. These non-terrestrial networks may simply not be able to receive/send encrypted RCS messages.

Telecommunication providers are always looking to enhance their coverage footprint, especially when it comes to rural area or mass landscape, which are especially challenging to cover due to the nature of the terrain via cellular towers. As such, significant investments are being made toward non-terrestrial network coverage that would improve cellular coverage for many users. However, these types of networks may have limited bandwidth as compared to their counterpart terrestrial networks. While RCS has many advantages, such as an enhanced user experience, it does require significant back and forth signaling, using network resources and bandwidth. While there may be network solutions to messaging on non-terrestrial networks that are not capable of RCS, a different issue arises for users that were RCS-capable in a terrestrial network, but then entered into the bounds of a non-terrestrial network.

An exemplary problematic use case would be for user B (e.g., a second user device) that was actively using RCS with user A (e.g., a first user device). After a period of time, user B moves into an area covered by a non-terrestrial network. User A may now attempt to text user B using encrypted RCS messaging capability cached locally to the device, which would result in RCS without any further pre-checks with the network. This may result in user B never receiving the RCS message, and instead it may be sent to the network's message store, and may be deleted if it stays in the message store for a period of time, such as if the designated store timer has expired. Missed or delayed messages are not ideal, and provide a poor user experience.

Multiple solutions will be described herein to solve the aforementioned problems with encrypted RCS messaging when a device enters a non-terrestrial network. The solutions apply when the capabilities of the devices are cached locally on the device. Otherwise, user A would send a SUBSCRIBE message for user B and the network would then indicate that user B's device is not RCS capable. Given that the cache is still valid and this step is bypassed, the device is actually consuming the cache with outdated information, as user B is no longer RCS-capable, and the network does not broadcast all changes related to user B and instead provides status when asked.

An exemplary timeline of events prior to the solution being implemented is as follows: At time 0 (T0): User A and User B were doing encrypted RCS while both on a terrestrial network. At time 1 (T1): User B steps into a non-terrestrial network. At time 2 (T2): User A consumed cache on local device and sends an RCS INVITE to user B. RCS clients following a Client Fallback to SMS (CFS) model at T2, for example, will always send RCS traffic and the network cannot interwork that traffic to legacy, which may cause user B to experience a delayed or completely lost message, depending on when the user device returns to a terrestrial network.

Using the exemplary timeline above, in a first aspect, at T1, when user B is registered on the non-terrestrial network, the RCS server records that user B's device is registered with a non-RCS-capable network (e.g., non-terrestrial network). Once the INVITE is received for user B at the server, it retrieves the user profile and determines that user B's device is registered with a non-RCS-capable network. At T2, when the INVITE reaches user B's RCS server, the INVITE is processed and treated as it normally would, but the Message Session Relay Protocol (MSRP) payload (also termed "payload" herein) is not accepted. MSRP is a protocol for transmitting a series of related instant messages in the context of a communications session. Not accepting the MSRP payload allows user A's device to still send the RCS MSRP payload, but an error is returned immediately (MSRP error report) to user A's device indicating the MSRP was not accepted by user B's device. This allows messages sent by user A to not be transmitted to the message store, hence no delayed or missed messages. Further, the MSRP error will be sent back to user A's device indicating that the message was not received by user B's device. An MSRP error can be a pre-existing error or can also be a new error sent back to user A's device letting the device know that user B's device did not receive the message, or that user B's device is not capable of RCS messaging at the moment (e.g. User B's device is currently capable of SMS only). The device manufacture has the option of either displaying the error and doing nothing more (e.g., user A could manually switch to SMS), or the device manufacturer could automatically cause the device to fallback and switch from RCS to SMS without user action. An advantage of sending an MSRP error is that the error is immediately sent to user A's device. Although the error occurs after the MRSP payload is received at the RCS server, this particular type of error results in an immediate notification to user A's device, thus allowing user A to know immediately that the RCS message will not be received by user B's device.

Again, using the timeline provided above, in a second aspect, at T1, when user B's device is registered on the non-terrestrial network, the RCS server may record the network as a non-RCS-capable network. Once the INVITE is received by the RCS server indicating that user A's device intends to transmit an encrypted RCS message to user B's device, it would pull user B's user profile and determine that user B's device is currently registered in a non-RCS-capable network. At T2, when the INVITE reaches user B's RCS server, it would reject the INVITE and a session initiation protocol (SIP) error would be returned to user A's device. In this aspect, the network's rejection is at the signaling level, before an attempt is made to transmit the MSRP payload from user A's device. With this advantage of making the rejection at an earlier stage of the process (e.g., before the MRSP payload is sent), this specific type of INVITE error may not be an immediate error, thus taking more time than the first aspect above to notify user A's device that user B's device is not capable of encrypted RCS messaging at the current time.

Yet another solution is provided using the above described timeline. In this third aspect, MSRP or SIP errors are avoided. Instead, a network generated message is sent back to user A's device indicating that user B's device is not capable of RCS messaging at the moment, and that in order to send a message to user B's device, user A needs to manually switch from RCS to SMS to send the attempted message. This solution requires that user A take manual action to send the intended message to user B's device, as it requires user A to manually change its device settings to use SMS instead of RCS.

Non-terrestrial networks, as used herein, may also be termed extraterrestrial networks or satellite radio access networks and may have any one or more characteristics suitable for use in a wireless telecommunication network environment. An extraterrestrial base station may take the form of a satellite. Generally, a satellite is characterized by its orbit around the earth. The orbit of any particular satellite will vary by operator desire and/or intended use; for example, a satellite base station suitable for use with the present disclosure may be characterized by its maximum orbital altitude and/or orbital period as Low Earth Orbit (LEO), Medium Earth Orbit (MEO), and High Earth Orbit (HEO). Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous on the basis that its orbital period is approximately equal to the length of a sidereal or solar day (approximately 24 hours); generally, a satellite in geosynchronous orbit will appear to be in the same position relative to a fixed point on the surface of the earth at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the earth.

An extraterrestrial base station is configured to wirelessly communicate with UEs. In aspects, each of the extraterrestrial base stations that may be used herein may communicate with a UE using any wireless telecommunication protocol desired by a network operator, including but not limited to 3G, 4G, 5G, 6G, 802.11x and the like. For instance, an extraterrestrial base station may have a wireless connection to one or more ground stations, wherein signals are communicated from a centralized radio station to one or more extraterrestrial base stations so that they may be relayed to UEs on the surface of the earth. In addition to a wireless telecommunication link (also referred to herein as simply a "wireless link") with one or more ground stations, each extraterrestrial base station is configured to wirelessly communicate with one or more UEs on the surface of the earth. An extraterrestrial base station may be said to provide wireless telecommunication coverage to a geographic area.

In order to connect to any base station, regardless of whether it is terrestrial or extraterrestrial, a UE must perform an active search to determine which base stations, if any, it is capable of connecting. This process is known to many in the art and referred to herein as a 'cell search,' and generally comprises acquiring time and frequency synchronization with a cell associated with a base station and detecting an identity of that cell by tuning to one or more specific frequencies, detecting/decoding synchronization signals, detecting/decoding a physical broadcast channel (PBCH), and detecting/decoding the physical downlink shared channel (PDSCH). When performing the cell search, a particular UE typically actively scans frequency bands in which it is capable of communicating for synchronization signals from a base station. Upon detection of synchronization signals from one or more base stations, the UE will perform a cell selection procedure (typically based on best quality of service metrics), perform an attachment procedure with the base station, and then being carrying out a wireless communication session. As noted earlier, cell search procedures are often quite taxing on a UE and, if performed constantly, can lead to rapid and undesirable depletion of a UE's battery. In order to prevent the constant active searching for signals during cell search, the present disclosure is directed to performing active cell searching only when a particular has reason to believe it is in or near a geographic coverage area of a base station.

A network, as used herein, may be part of a telecommunication network that connects subscribers to their service provider. In aspects, the service provider may be a telecommunications service provider, an internet service provider, or any other similar service provider that provides at least one of voice telecommunications and data services to any or all of the user devices. For example, a network may be associated with a telecommunications provider that provides services (e.g., LTE, 5G, 6G) to the user devices. Additionally or alternatively, network may provide voice, text, and/or data services to user devices or corresponding users that are registered or subscribed to utilize the services provided by a telecommunications provider. A network may comprise any communication network providing voice, text, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network may also be, in whole or in part, or have characteristics of, a self-optimizing network.

In accordance with one aspect of the present invention, a method is provided for facilitating RCS error messaging in a non-RCS capable network. The method includes determining that a first device and a second device are communicating using encrypted RCS messaging in a terrestrial network, determining that the second device has transitioned from the terrestrial network to a non-terrestrial network, and determining that the first device has sent an encrypted RCS message intended for the second device. Further, the method includes, based on the second device transitioning to the non-terrestrial network that does not support the encrypted RCS messaging, communicating an error message to the first device indicating that the encrypted RCS message cannot be received by the second device.

In accordance with another aspect of the present invention, one or more computer-readable media having computer-executable instructions embodied thereon are provided that, when executed, perform a method for facilitating RCS error messaging in a non-RCS capable network. The method includes determining that a first device has sent a signaling message indicating that the first device intends to send an encrypted RCS message to a second device, determining, based on a user profile associated with the second device, that the second device is currently registered with a non-terrestrial network that does not support encrypted RCS messaging, and, based on the second device being registered with the non-terrestrial network, communicating an error message to the first device.

In accordance with yet another aspect of the present invention, a system is provided for facilitating RCS error messaging in a non-RCS capable network. The system includes one or more processors and one or more computer storage hardware devices storing computer-usable instructions that, when used by the one or more processors, cause the one or more processors to perform method steps. The method steps include determining that a first device is attempting to send an encrypted RCS message intended for a second device, determining that the second device is currently registered with the non-RCS capable network, and communicating an error message to the first device.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
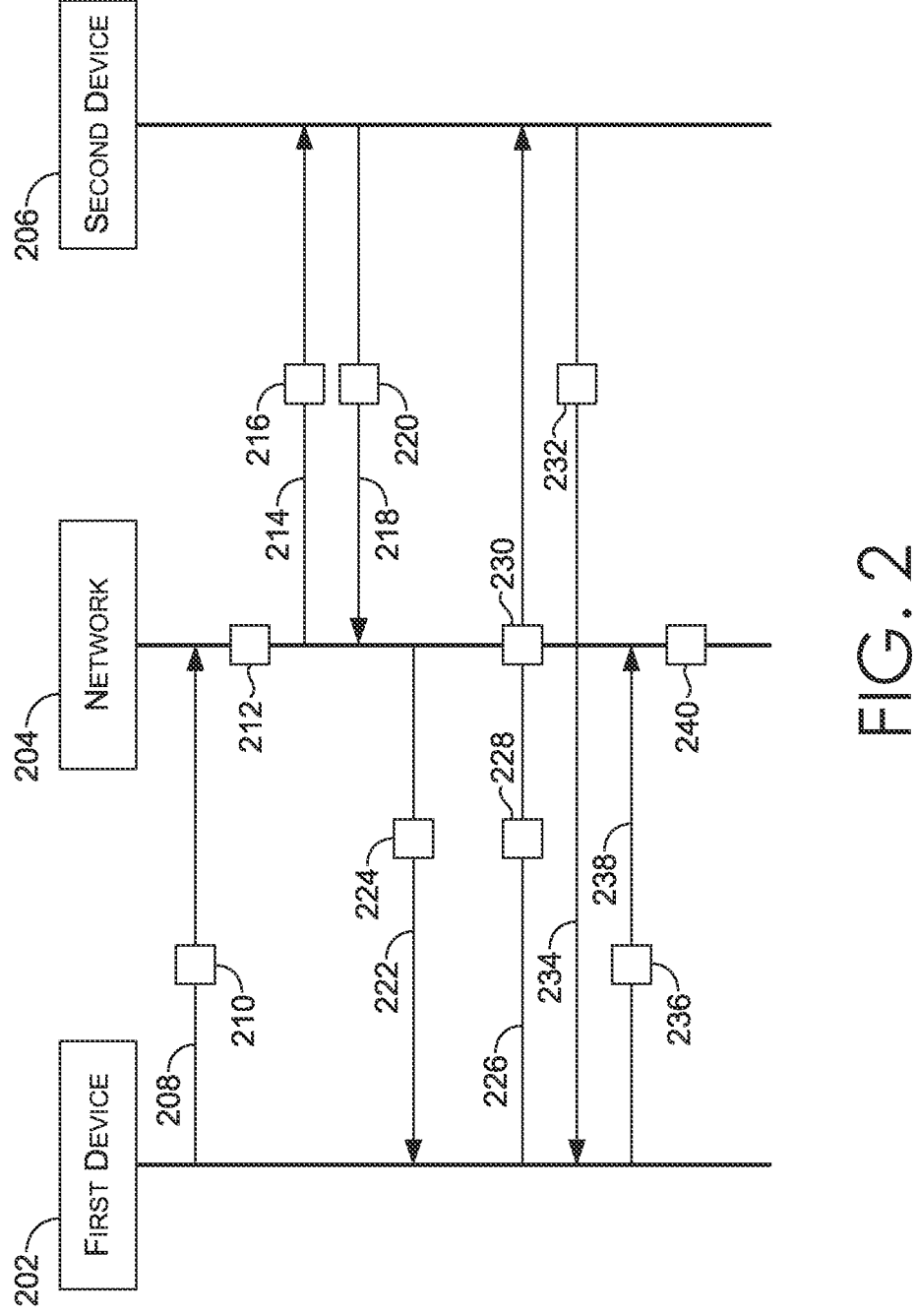
FIG. 2 illustrates a call-flow diagram in which implementations of the present disclosure may be employed.

FIG. 2 is a ping diagram illustrating various methods for facilitating RCS error messaging in a non-RCS capable network. A first device 202, network 204, and second device 206 are illustrated in FIG. 2. Initially, an INVITE message 210 is communicated 208 from the first device 202 to the network 204. FIG. 2 has been simplified in some ways so as to not obstruct aspects discussed herein. As such, while item 204 is termed "network," it may be a particular network component, such as an RCS server associated with second device 206. In one aspect, the network 204 makes a determination to reject the INVITE, shown at item 212. The rejection to the INVITE is made based on, in this aspect, the second device 206 not being RCS-capable at the current time (e.g., has entered into a non-terrestrial network). Here, an error message is sent back to the first device 202. Step 212 is present only for particular aspects described herein, such as the second aspect described above. As mentioned in the second aspect, the error occurs after the very first signaling message and prior to the MSRP payload being transmitted. These types of errors are not required to be sent immediately, and as such, it could be one or more minutes before an error message is sent to the first device 202.

If step 212 does not occur, the invite 216 is communicated 214 from the network 204 to the second device 206. The second device 206 communicates 218 an acknowledgement 220 back to the network 204, the acknowledgement 224 also being communicated 222 back to the first device 202. At this point, the first device 202 communicates 226 the message payload 228 to the second device 206 through the network 204. In one aspect, described herein with respect to the first aspect above, the network 204 identifies an error at item 230 as the message payload 228 is being communicated. Here, the message payload 228 does not get communicated all the way to the second device 206, but instead is stopped at the network 204 as the network determines that the second device 206 is not RCS-capable as it is registered with a non-terrestrial network. At 230, the network 204 determines that the second device 206 is not RCS-capable and also immediately sends an error message to the first device 202 indicating the same. This type of error message may be communicated to the first device within a predetermined amount of time from the first device sending the encrypted RCS message intended for the second device. For instance, this predetermined amount of time may be one second, two seconds, three seconds, five seconds, ten seconds, or the like.

There are two actions that may be taken with this error message. The first option is that the network 204 immediately sends the error message back to the first device 202, and the first device 202 takes no action on the error message. A second action is that the first device 202 receives the error message and automatically falls back to SMS or another form of text messaging. This would allow the user of the first device 202 to be able to send the original message to the second device 206.

The second device 206 then communicates 234 and acknowledgement 232 to the first device 202 that the message payload was received. The first device 202 communicates 238 an acknowledgement 236 to the network 204. In an exemplary aspect, if the second device 206 is not RCS-capable but an error message is not generated at either item 212 or item 230, an error message may be generated at item 240. This error message may be a bounceback message (e.g., a SMS message) indicating that although the message was communicated to the second device 206, the second device 206 was not able to receive it. For this type of error message, no action may be taken at the first device 202 but instead, the user of the first device 202 would need to manually change its device settings to SMS or another form of message communication.

Turning now to FIG. 3, an exemplary method 300 for facilitating Rich Communication Services (RCS) error messaging in a non-RCS capable network is provided. At step 302, it is determined that a first device and a second device are communicating using encrypted RCS messaging in a terrestrial network. At step 304, it is determined that the second device has transitioned from the terrestrial network to a non-terrestrial network, such as a satellite radio access network. At step 306, it is determined that the first device has sent an encrypted RCS message intended for the second device. An error message is communicated, at step 308, to the first device indicating that the encrypted RCS message cannot be received by the second device. In some aspects, the first device is caused to automatically fallback to SMS based on the error message, but in other aspects, the first device is manually modified to send an SMS message based on the error message. Further, in some aspects, the error message may be communicated to the first device within a predetermined amount of time from the first device sending the encrypted RCS message intended for the second device. For instance, this predetermined amount of time may be one second, two seconds, three seconds, five seconds, ten seconds, or the like.

FIG. 4 illustrates another exemplary method 400 for facilitating Rich Communication Services (RCS) error messaging in a non-RCS capable network. At step 402, it is determined that a first device has sent a signaling message indicating that the first device intends to send an encrypted RCS message to a second device. At step 404, it is determined, based on a user profile associated with the second device, that the second device is currently registered with a non-terrestrial network, such as a satellite radio access network, that does not support encrypted RCS messaging. An error message (e.g., SIP error) is communicated to the first device at step 406. In some aspects, the first device is caused to automatically fallback to SMS based on the error message, but in other aspects, the first device is manually modified to send an SMS message based on the error message. In this described aspect, the error is determined prior to the message payload being sent by the first device, but after the initial signaling (INVITE) is sent by the first device.

FIG. 5 illustrates another exemplary method 500 for facilitating RCS error messaging in a non-RCS capable network. At step 502, it is determined that a first device is attempting to send an encrypted RCS message intended for a second device. At step 504, it is determined that the second device is currently registered with the non-RCS capable network, such as a satellite radio access network. An error message is communicated to the first device at step 506. In some aspects, the first device is caused to automatically fallback to SMS based on the error message, but in other aspects, the first device is manually modified to send an SMS message based on the error message.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

What is claimed is:

1. A method for facilitating Rich Communication Services (RCS) error messaging in a non-RCS capable network, the method comprising:
    determining that a first device and a second device are communicating using encrypted RCS messaging in a terrestrial network;
    determining that the second device has transitioned from the terrestrial network to a non-terrestrial network;
    determining that the first device has sent an encrypted RCS message intended for the second device; and
    based on the second device transitioning to the non-terrestrial network that does not support the encrypted RCS messaging, communicating an error message to the first device indicating that the encrypted RCS message cannot be received by the second device.

2. The method of claim 1, wherein the first device is caused to automatically fallback to Short Messaging Service (SMS) based on the error message.

3. The method of claim 1, wherein the first device is manually modified to send an SMS message based on the error message.

4. The method of claim 1, wherein the non-terrestrial network is a satellite radio access network.

5. The method of claim 1, wherein the error message is communicated to the first device within a predetermined amount of time from the first device sent the encrypted RCS message intended for the second device.

6. The method of claim 5, wherein the predetermined amount of time is less than five seconds.

7. One or more non-transitory computer-readable media having computer-executable instructions embodied thereon that, when executed, perform a method for facilitating Rich Communication Services (RCS) error messaging in a non-RCS capable network, the method comprising:
    determining that a first device has sent a signaling message indicating that the first device intends to send an encrypted RCS message to a second device;
    determining, based on a user profile associated with the second device, that the second device is currently registered with a non-terrestrial network that does not support encrypted RCS messaging; and
    based on the second device being registered with the non-terrestrial network, communicating an error message to the first device.

8. The media of claim 7, wherein the signaling message is a first signaling message sent by the first device prior to a payload message.

9. The media of claim 7, wherein the error message is a session initiation protocol (SIP) error.

10. The media of claim 7, further comprising accessing a user profile associated with the second device to determine that the second device is currently registered to the non-terrestrial network.

11. The media of claim 7, wherein the error message is communicated to the first device prior to the first device sending the encrypted RCS message.

12. The media of claim 7, wherein the non-terrestrial network is a satellite radio access network.

13. The media of claim 7, wherein the first device is manually modified to send an Short Messaging Service (SMS) message based on the error message.

14. The media of claim 7, wherein the first device is caused to automatically fallback to SMS based on the error message.

15. A system for facilitating Rich Communication Services (RCS) error messaging in a non-RCS capable network, the system comprising:

one or more processors; and one or more computer storage hardware devices storing computer-usable instructions that, when used by the one or more processors, cause the one or more processors to:

determine that a first device is attempting to send an encrypted RCS message intended for a second device;

determine that the second device is currently registered with the non-RCS capable network; and communicate an error message to the first device.

16. The system of claim 15, wherein the error message is communicated to the first device prior to the first device sending the encrypted RCS message.

17. The system of claim 15, wherein the error message is communicated to the first device subsequent to the first device sends the encrypted RCS message.

18. The system of claim 15, wherein the non-terrestrial network is a satellite radio access network.

19. The system of claim 15, wherein the first device is manually modified to send a Short Messaging Service (SMS) message based on the error message.

20. The system of claim 15, wherein the first device is caused to automatically fallback to SMS based on the error message.

* * * * *